US009436844B2

(12) United States Patent
Love et al.

(10) Patent No.: US 9,436,844 B2
(45) Date of Patent: Sep. 6, 2016

(54) ACCESS ENABLEMENT SECURITY CIRCUIT

(71) Applicant: Microsoft Corporation, Redmond, WA (US)

(72) Inventors: Michael Love, Union City, CA (US); Walker Robb, Seattle, WA (US); Avdhesh Chhodavdia, Fremont, CA (US); Paul Paternoster, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/013,561

(22) Filed: Aug. 29, 2013

(65) Prior Publication Data

US 2015/0067771 A1    Mar. 5, 2015

(51) Int. Cl.
  *G06F 21/71* (2013.01)
  *G06F 21/74* (2013.01)
  *G06F 21/75* (2013.01)
  *G06F 21/57* (2013.01)
  *G06F 21/62* (2013.01)
  *G06F 21/44* (2013.01)

(52) U.S. Cl.
  CPC ............. *G06F 21/629* (2013.01); *G06F 21/44* (2013.01)

(58) Field of Classification Search
  CPC ........ G06F 21/57; G06F 21/71; G06F 21/74; G06F 21/75
  USPC ..................................... 726/2, 16, 26, 27, 34
  See application file for complete search history.

(56) References Cited

U.S. PATENT DOCUMENTS

| | | | |
|---|---|---|---|
| 6,980,239 B1 * | 12/2005 | Motta | ......................... 348/211.6 |
| 7,310,721 B2 | 12/2007 | Cohen | |
| 7,742,597 B2 | 6/2010 | Lewis | |
| 7,822,993 B2 | 10/2010 | Morais et al. | |
| 8,037,437 B2 | 10/2011 | Davis et al. | |
| 8,195,914 B2 | 6/2012 | Hall et al. | |
| 8,255,578 B2 | 8/2012 | Maietta | |
| 8,255,700 B2 | 8/2012 | Kitariev et al. | |
| 8,285,980 B1 | 10/2012 | Feng et al. | |
| 2004/0025010 A1 | 2/2004 | Azema et al. | |
| 2004/0025011 A1 | 2/2004 | Azema et al. | |
| 2007/0209072 A1 | 9/2007 | Chen | |

(Continued)

OTHER PUBLICATIONS

U.S. Appl. No. 14/026,804, filed Sep. 13, 2013.

(Continued)

*Primary Examiner* — Joseph P Hirl
*Assistant Examiner* — Kalish Bell
(74) *Attorney, Agent, or Firm* — Gregg Wisdom; Judy Yee; Micky Minhas

(57) ABSTRACT

A system-on-chip (SoC) is provided that includes a centralized access enablement circuit for controlling access to a plurality of security features for multiple hardware modules of the system. Progressive security states corresponding to different stages in a chip's design, manufacture and delivery are utilized to enable different access control settings for security features as a part moves from design to end-use. The access enablement circuit for a SoC implementing different security states provides individual access control settings for security features in the different security states. One-time programmable memory and register controls are provided in one embodiment that allow different access control settings for an individual security feature in the same or different security states of the system.

27 Claims, 5 Drawing Sheets

(56) References Cited

U.S. PATENT DOCUMENTS

| | | | |
|---|---|---|---|
| 2008/0148343 | A1 | 6/2008 | Taniguchi |
| 2008/0263362 | A1 | 10/2008 | Chen |
| 2008/0282087 | A1 | 11/2008 | Stollon et al. |
| 2009/0296933 | A1* | 12/2009 | Akselrod et al. ............. 380/277 |
| 2010/0005314 | A1 | 1/2010 | Johnson et al. |
| 2010/0106899 | A1 | 4/2010 | Pong |
| 2011/0066835 | A1 | 3/2011 | Kothari et al. |
| 2011/0302577 | A1 | 12/2011 | Reuther et al. |
| 2012/0082171 | A1 | 4/2012 | Georgiou et al. |
| 2012/0137119 | A1* | 5/2012 | Doerr et al. .................. 713/100 |
| 2013/0022201 | A1 | 1/2013 | Glew et al. |
| 2013/0086385 | A1 | 4/2013 | Poeluev |
| 2013/0205139 | A1 | 8/2013 | Walrath |
| 2013/0212382 | A1 | 8/2013 | Etchegoyen et al. |
| 2013/0290286 | A1* | 10/2013 | Su et al. ........................ 707/704 |
| 2014/0108825 | A1 | 4/2014 | O'Loughlin et al. |
| 2014/0359755 | A1* | 12/2014 | Beitel et al. .................... 726/18 |
| 2015/0095661 | A1 | 4/2015 | Sell et al. |

OTHER PUBLICATIONS

Akselrod, et al., "Platform Independent Debug Port Controller Architecture with Security Protection for Multi-Processor System-on-Chip ICs", In Proceedings of the Conference on Design, Automation and Test in Europe: Designers' Forum, Mar. 6, 2006, 6 pages.

"Discretix Secure Debug Module (DxSDM)", Retrieved on: Apr. 29, 2013, Available at: http://www.discretix.com/Products-Solutions/Secure-Debug.html.

Non-final Office Action dated Jan. 2, 2015, U.S. Appl. No. 14/026,804, filed Sep. 13, 2013.

Altmark, Alan, "Understanding z/VM Integrity and Security," Published on: Nov. 2002, Available at: http://www.ibmsystemsmag.com/mainframe/administrator/security/Understanding-z-VM-Integrity0and-Security/?page=2.

Li, et al., "Secure Virtual Machine Execution under an Untrusted Management OS," In IEEE 3rd International Conference on Cloud Computing, Jul. 5, 2010, 8 pages.

Suh, et al., "Efficient Memory Integrity Verification and Encryption for Secure Processors," In Proceedings of the 36th Annual International Symposium on Microarchitecture, Dec. 2003, 15 pages.

"Security Model for the Next-Generation Secure Computing Base," Published on: Feb. 6, 2004, Available at: http://www.microsoft.com/resources/ngscb/documents/NGSCB_Security_Model.doc.

Fujiyama, Hiroyuki, "System-on-a-Chip with Security Modules for Network Home Electric Appliances," Fujitsu Sci. Tech. J., vol. 42, No. 2, Apr. 2006, pp. 227-233.

* cited by examiner

| AEB Table | | | | |
|---|---|---|---|---|
| Output | State 1 | State 2 | REV_SEL | OTP |
| Clock | HWNO | HWYES | 0 | 1 |
| Reset | HWYES | Y/SPWL | 0 | 1 |
| Debug | HWNO | Y/SPWL | 0 | 0 |
| I/O Pads | HWNO | N/SPWL | 0 | 0 |
| Bus Interface | HWNO | N/SPWL | 0 | 0 |
| DFT | HWNO | N/SPWL | 0 | 1 |
| Test Circuit | HWYES | Y/SPWL | 1 | 0 |

ACCESS ENABLEMENT SECURITY CIRCUIT

BACKGROUND

The disclosed technology is related to system-on-chip security.

A system-on-chip (SoC) integrates the components of an electronic system such as a computer into a single integrated circuit or chip. It may contain digital, analog, mixed-signal, and radio-frequency functions. A typical SoC can include a microcontroller, microprocessor or digital signal processor (DSP) cores. Some SoCs, referred to as multiprocessor System-on-Chip (MPSoC), include more than one processor core. Other components include memory blocks such as ROM, RAM, EEPROM and Flash, timing sources including oscillators and phase-locked loops, peripherals including counter-timers, real-time timers and power-on reset generators, external interfaces including industry standards such as USB, FireWire, Ethernet, USART, SPI, analog interfaces such as analog-to-digital converters (ADCs) and digital-to-analog converters (DACs), and voltage regulators and power management circuits. Example applications for SoC include music players and video game consoles, among many other possible applications.

SOC's often expose interfaces to security features that allow developers and manufacturers of the devices to test and/or evaluate the devices. These interfaces are typically exposed as one or more pins that can be accessed by the developers or manufacturers of the devices, but can be interfaced in other manners. Although these interfaces are useful to the developers or manufacturers of the SoC's, they can also be a point of vulnerability for a system. For example, malicious users can attempt to use these interfaces to obtain access to internal components of the system and obtain access to data or information to which they were not intended to have access.

SUMMARY

A system-on-chip (SoC) is provided that includes a centralized access enablement circuit for controlling access to a plurality of security features for multiple hardware modules of the system. The access enablement circuit provides a central location for managing security features and in conjunction with an access enablement table, provides a central point for establishing access control settings for the security features. Progressive security states corresponding to different stages in a chip's design, manufacture and delivery are utilized to enable different access control settings for security features as a part moves from design to end-use. The access enablement circuit for a SoC implementing different security states provides individual access control settings for security features in the different security states. One-time programmable memory and register controls are provided in one embodiment that allow different access control settings for an individual security feature in the same or different security states of the system.

The design of an access enablement circuit is controlled by the access enablement table. The table contains an implementation definition of the access enablement circuit for controlling the security features of a SoC. The access enablement table provides a simple, understandable and centralized view of security control and access for the system. The table may provide security specific controls for security features and for each security feature, define an access control setting based on the security state of the SoC.

A circuit implementation is automatically generated from the access enablement table using an automated software-based technique. The results of parsing are used to automatically generate a hardware description for the access enablement circuit, reducing errors associated with manual processes.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Systems-on-chip (SoC's) and related techniques for designing and manufacturing SoC's are provided. A centralized access enablement circuit controls access to a plurality of individual security features for a SoC, such as test, debug, and/or evaluation interfaces provided by the different modules of the system. The access enablement circuit provides a central location and design point for managing the various security features provided by the SoC. In this manner, the access enablement circuit provides a central location for enabling and disabling hardware within the system to control security features.

A SoC in one embodiment defines different security states, providing irreversible progression through the security states as the chip is manufactured. The access enablement circuit for a SoC implementing different security states provides individual access control settings for the different security states. In this manner, each security feature can have an individual control setting for the different security states, allowing select features to be enabled for a given security state. One-time programmable memory and register controls are provided in one embodiment that allow different access control settings for an individual security feature.

An access enablement table is provided that contains an implementation definition of the access enablement circuit for controlling the security features of a SoC. An access control setting for each individual security feature is provided in the table comprising one or more input parameters. The access enablement table provides a simple, understandable and centralized view of security control and access for the system. By way of example, the table may provide security specific controls for each security feature, including the ability to control a feature as always on, always off, programmable with default on and off, and lockable, or a more complex function based on its inputs. For example, a security feature may be defined based on a logical combination of settings for other security features. For each security feature, the access enablement table defines an access control setting for the security feature based on the security state of the SoC.

A circuit design for the access enablement circuit is automatically generated from the access enablement table. Using an automated script-based technique, the access enablement table is parsed into the components for generating a hardware description language (HDL) representation of the access enablement circuit. This can include parsing the table into one or more ROM components and an output signal list for the access enablement circuit in one example. The results of parsing are used to automatically generate the HDL for the access enablement circuit. Each output signal and ROM can be instantiated, along with adding connecting logic for the components.

Figures 1, 3:
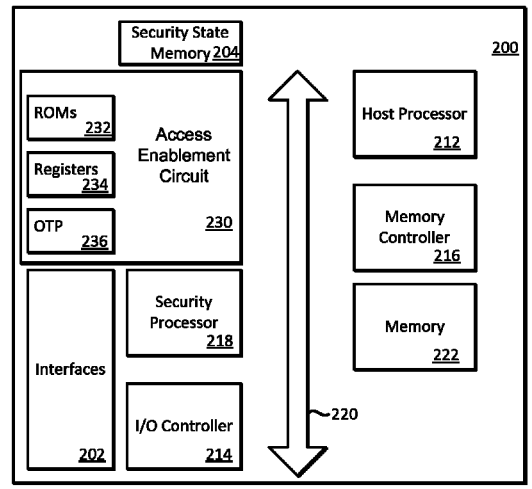
FIG. 1 is a block diagram depicting a system-on-chip (SOC) including access enablement circuitry.
FIG. 3 is a block diagram depicting an access enablement table in accordance with one embodiment.

FIG. 1 illustrates an example of a system-on-chip (SoC) 200 having an access enablement circuit in accordance with one or more embodiments. SoC 200 includes one or more interfaces 202 that expose debug, test and/or evaluation features within the SoC. Collectively, these features are referred to as security features. Interfaces 202 may include one or more pins used as a port or otherwise for external communication with SoC 200. By way of non-limiting example, interfaces 202 may expose security features such DFT JTAG tap controllers, DFT P1500 Tap controllers, DFT test features such as scan dump, memory dump, memory BIST, JTAG SW debuggers for embedded processors, JTAG bridges to on-chip busses, on-chip debug bus logic, security fences, voltage glitch detection circuits/level monitors, clock glitch detection circuits/level monitors, temperature monitors, input/output (I/O) signal glitch catcher circuits, digital and analog debug busses, digital and analog test busses, bypass, clock enables, PLL test circuits, general purpose I/O's, on-chip clock stop circuitry, clock controls, reset controls, test busses, input/output (I/O) pads, DFT features, or any other security components for which access is to be controlled.

System on chip 200 includes a host processor 212, an input/output (I/O) controller 214, a memory controller 216, and a security processor 218 that can communicate with one another via a bus 220. The system bus 220 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus, and the Advanced Microcontroller Bus Architecture (AMBA) bus. DMA controllers which route data directly between external interfaces and memory, bypassing the processor core and thereby increasing the data throughput of the SoC can also be used. Although particular components are illustrated in FIG. 1, it is to be appreciated that additional or fewer components can be included in system-on-chip 200. For example, additional controllers or processors can be included, cache memories can be included, multiple security processors 218 can be included, and so forth. In one embodiment, a stand-alone security processor 218 is not included in SoC 200. For example, security processing may be provided by host processor 212.

Memory controller 216 controls access to and operations for memory 222. Memory 222 can include volatile media (such as random access memory (RAM)) and/or nonvolatile media (such as read only memory (ROM), Flash memory, and so forth). Memory controller 216 allows different components of system on chip 200, such as host processor 212 and security processor 218, to write to and/or read from memory 222. Data and/or instructions can be read from and/or written to memory 222, such as instructions of a program to be executed by security processor 218 or host processor 212, data for a program being executed by security processor 218 or host processor 212, and so forth. Host processor 212 executes one or more programs that provide various functionality of device 200, such as audio and/or video recording and/or playback, gaming and/or other recreational functions, and so forth.

I/O controller 214 allows one or more external components or devices to communicate with components or modules of device 200. I/O controller 214 operates in a conventional manner to identify signals received via the pins or other connection mechanism of external interfaces 202, and to detect signal values based on the identified signals. These signals can be, for example, changes in voltage levels that indicate digital values of 0 or digital values of 1. In response to detecting a signal value on a pin or other connection mechanism of external interfaces 202, I/O controller 214 provides the detected signal value to another component of system on chip 204, typically host processor 212 or security processor 218.

Security processor 218 executes one or more programs that provide security functionality for system on chip 200. This security functionality can include, for example, encryption and/or decryption of data, verifying digital signatures of instructions (e.g., programs or modules) that are included in memory 222 so that only verified instructions are executed by security processor 218 and/or host processor 212, and so forth.

Access enablement circuit (AEC) 230 is a centralized circuit that controls access to the individual security features of SoC 200, for example, as may be exposed over interfaces 202. AEC 230 provides individual control of each security specific feature of SoC 200 from a centralized location. For each security feature, the AEC 230 controls the feature as always enabled, always disabled, programmable by security processor 218 or other component, with default on or off, and lockable. The AEC 230 may also control the feature using a complex function based on inputs for the security feature. A lockable security feature is one where the security processor 218 or other component can enable or disable the feature, but then cannot further modify the feature for a current power cycle of the part. In one example, AEC 230 provides and controls an output for controlling each security feature of the SoC 200. Each output can include a wire or subset of wires in the circuit that control a particular security feature. With a subset or multiple wire implementation in one embodiment, logic may be used at the destination to determine the state of enablement.

A set of security states for SoC 200 are defined using one-time programmable security state memory 204, such as programmable fuses, to enable different security feature sets for a part at different times in one embodiment. The set of security states and a pre-defined progression through them can be defined by blowing or otherwise programming the memory 204 as the part undergoes manufacturing, testing, and then is provided to an end-user. One embodiment provides a set of security states with each security state having a particular set of behaviors defined for the set of security features. For each security state, the individual security features may be enabled, disabled, have a default setting with software programmability, and/or the ability to be locked. In this manner, each security state may be defined with a different set of available security features. In one embodiment, the security states have a defined irreversible progression as the part is manufactured. For example, the part may have an initial or blank state defined for its manufacturing phase. In this blank state, the access enablement circuitry may generally provide access to many of the security features. In other examples, the initial blank state may disable many security features, for example, to prevent exposures to security states being glitched to a blank state with voltage attacks and thereby exposing security features. The AEC 230 may also limit access to various functional elements at this stage. After manufacturing, the fuses may be programmed to a different encoding defining a test security state. In the test security state, for example, the AEC 230 may generally provide access to most security features and functional features. Before shipping the SoC 230 to an end-user, an operational security state may be programmed into the fuses. In this state, most security features may be disabled while most or all functional elements are enabled. As noted above and described hereinafter, software programmability and other means may be used to control the behavior for a security feature, rather than only defining an enabled or disabled condition.

Access enablement circuitry 230 includes or accesses ROM's 232 in one embodiment to further control individual security features. For example, the AEC 230 may define a default access control for a security feature using a first ROM and define the influence of software on the security feature using a second ROM. In other example, other memories can be used to define access control settings and software influences. For example, programmable fuses or SRAM loaded from a software table may be used. AEC 230 additionally includes or accesses a set of data registers 234 in one embodiment. The data registers can be modified by software and/or the security processor 218 in one embodiment to enable, disable, and/or lock a corresponding security feature. The AEC may read the set of data registers to determine an access control setting for a security feature. Finally, AEC 230 includes or accesses a set of one-time programmable fuses 236 in one embodiment that provide additional control over security features. For example, in a particular security state, the OTP fuses may permit the same security feature to have a different behavior based on the OTP bits. In this manner, the OTP fuses can be programmed after manufacture to alter the access control setting for a security feature.

Figure 2:
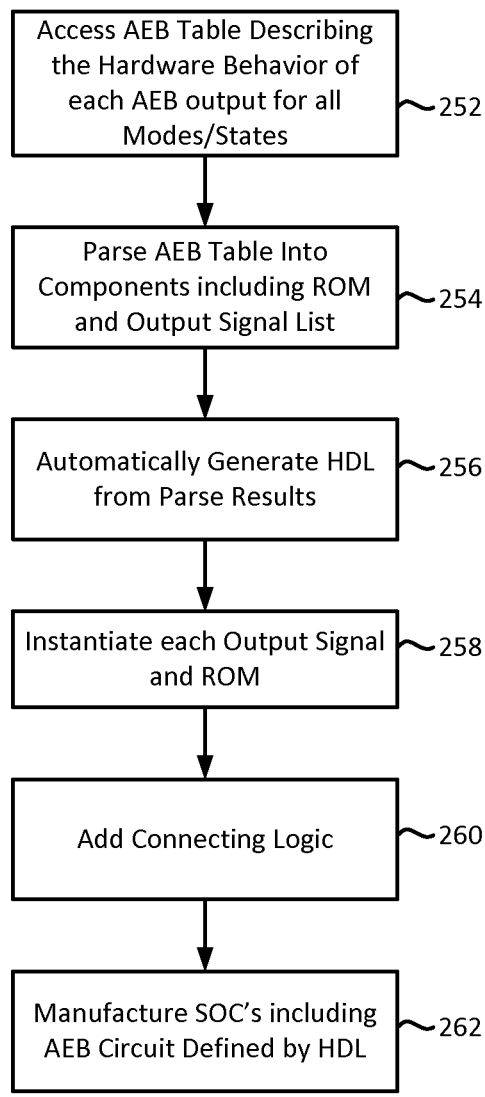
FIG. 2 is a flowchart describing a process for generating a SoC design including access enablement circuitry.

FIG. 2 is a flowchart describing a method of manufacturing a SoC including an access enablement circuit in accordance with an embodiment. At step 252, an access enablement table is accessed that fully describes the hardware behavior for the access enablement circuit. The AEB table includes entries for each output of the AEC, setting the behavior of each output for each mode and security state of the chip. At step 254, the AEB table is parsed using an automated script to generate the components for the AEC. The table is parsed into the components for an HDL description of the AEC. The components may include ROM's that define the output behaviors of the output signals of the AEC for controlling the security features of the chip. At step 256, an HDL description of the AEC circuit is generated. As steps 258 and 260 illustrate, generating the HDL description may include instantiate each output signal of the AEC, instantiating each ROM, and adding connecting logic to define how the ROM data is utilized to control the behavior of each output signal. At step 262, SoC's are manufactured using the generated HDL description of the AEC. As FIG. 2 illustrates, the ROM based implementation permits changes to the ROM contents simply by altering the AEB table. This permits changes to the AEC design in subsequent silicon revisions without significant digital or physical design impacts.

FIG. 3 is a block diagram describing an example of an access enablement table according to one embodiment. The AEB table forms the complete basis for a hardware description (HDL) implementation of an access enablement circuit in one embodiment. The AEB table is provided as a spreadsheet in one example, containing the implementation definition for the security features of the SoC. Each security feature is set forth as a row in the spreadsheet under the "Output" heading. The complete access enablement definition for a security feature includes several parameters set forth as the columns in the spreadsheet. When combined, the features in the column define access control to the security feature in all implementation aspects.

In the specific example of FIG. 3, a set of seven exemplary security features are set forth. The security features include a "Clock" security feature which can be used to gate clocks or select signals for clock muxes to provide secured clock gating or switching. A "Reset" security feature can be used to either issue a reset or mask a reset issued by other less trusted entities. A "Debug" security feature controls access to on-chip debug circuits. An "I/O Pads" security feature controls access to I/O pads of the chip for enablement or configuration purposes. A "Bus Interface" security feature controls access to certain client on a given bus or an entire bus interface. A "DFT" security feature controls access to DFT features such as scan, MBIST, memory dump, scan dump, and boundary scan. The depicted security features are provided by way of example only. Different SoC implementations may include different security features than those depicted in FIG. 3.

A first column of the AEB table corresponds to a first security state of the chip as programmed in the set of fuses 204. The first security state column sets forth the security behavior for each of the security features when the chip is in the first security state. In this example, the "Clock" security feature is set to HWNO. The HWNO access control setting indicates that the "Clock" security feature is hardware disabled when the chip is in the first security state. For example, the AEC generated from the table will generate an output in the first security state that disables or otherwise prevents access to clock gating and switching. The "Reset" security feature is set to HWYES. The HWYES access control setting indicates that for the first security state, the "Reset" feature or ability to issue a reset or mask a reset is always hardware-enabled. The control settings for the remaining security features for the first security state are set forth with either HWYES or HWNO designations.

A second column of the AEB table corresponds to a second security state of the chip. In the second security state, the "Clock" security feature is set to HWYES as earlier described. The "Reset," "Debug" and "Test Circuit" security features are each set to Y/SPWL. The "Y" access control setting designates that the security feature is enabled by default when in the second security state. The additional SPWL designation defines the security feature as "Security Processor Write Locked." In this manner, the AEB table sets forth that the security processor may disable the feature from its default enabled setting, and optionally also lock the feature from being enabled for the current boot cycle. The "I/O Pads," "Bus Interface," and "DFT" security features are each set to N/SPWL. The "N" access control setting sets forth that the security feature is disabled by default. The additional SPWL access control setting, in conjunction with the default "N" access control setting, sets forth that the security processor may enable the feature, and optionally also disable it again and lock it from being enabled again for the current boot cycle.

The access control setting for a security feature can also be based on the access control setting of one or more other security features. For example, it may be determined that for a certain combination of enabled security features, another security feature should have a particular setting. Accordingly, the entry for such a feature in a given security state may be defined by the access control settings for one or more other security settings in that security state. In one example, the AEB table may include an additional column with an index list. The table entry for a feature can then be based on a logical combination of index lookups from other features in the table. Moreover, the table entry for a security feature may be based on state logic from any other location within the table. For example, the entry may be a logical combination of the outputs of other rows. In another example, the security feature entry may be a logical combination of the inputs for one or more other entries in the table. Such rows may be defined as custom rows. An equation can be defined for a row based on any input, or logic from another row.

The AEB table in FIG. 3 has several optional columns that permit further control over the security features of the SoC. The OTP column permits a particular security feature to have different behaviors or access control under the same security state. If a "1" is set forth in the column for a security feature, the security feature can be controlled by data from a one-time programmable (OTP) memory. In this manner, one or more OTP bits can be programmed after the chip is designed and manufactured to change the access control for a security feature when under a particular security state. For example, the "Clock" security feature may have a default access control of "HWNO" when the corresponding OTP bit is not programmed, for example binary "0." If the corresponding OTP bit is programmed, for example to binary "1," the AEC circuitry may permit access to the "Clock" security feature.

The REV_SEL column allows certain features to have an override for one or more revisions for the chip manufacture. For example, a new "test circuit" or other circuit may be provided in a chip as a prototype or otherwise as a completely untested component whose behavior cannot be guaranteed. The REV_SEL designation allows the feature to be bypassed for a first or subsequent silicon revision of the chip. For example, if the new circuit does not work or perform in a manner consistent with the SoC operation, the REV_SEL designation permits an override of the feature during the revision of the current revision and optionally subsequent revisions of the silicon. As earlier described, the table may be extended in other manners to take any input from the SoC.

Although not shown, the AEB table may include additional rows that are implemented as spares in the AEC implementation. In one example, an additional spare row can include the most commonly used ROM implementations. During a real silicon spin process, the spare rows can be connected to minimize design changes. Furthermore, this enables independent control over a security feature that may have not been enabled for control in an earlier silicon revision.

Figure 4:
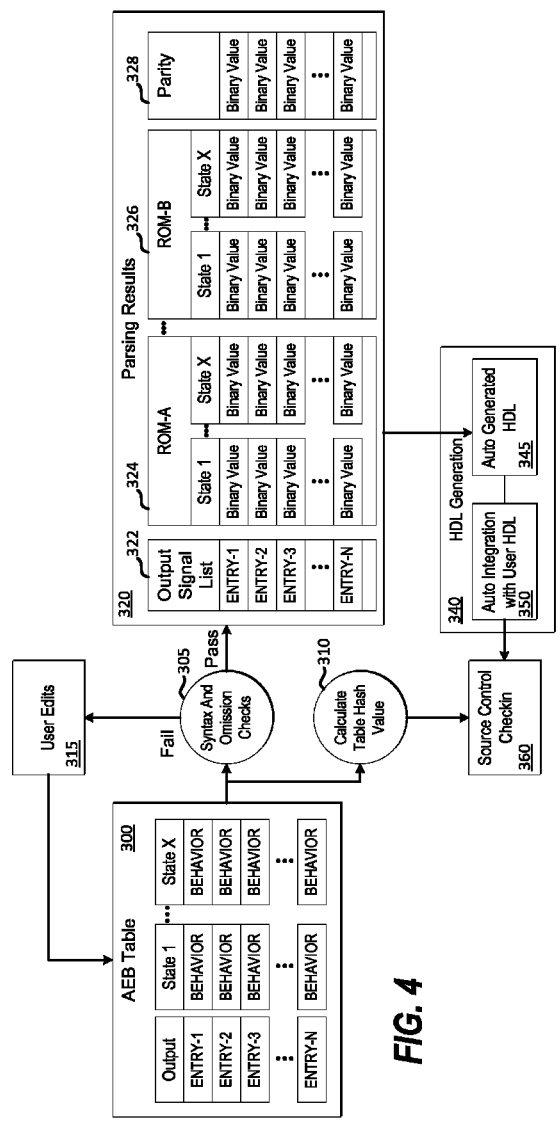
FIG. 4 is a block diagram depicting the generation of a SoC design having access enablement circuitry defined by an access enablement table.

FIG. 4 is a block diagram depicting the generation of a hardware description language (HDL) description for an access enablement circuit according to one embodiment. An access enablement table 300 is provided including a plurality of rows corresponding to a set of security features for a SoC, and a plurality of columns corresponding to a set of security states for the SoC. As described with respect to FIG. 2, the table can include additional columns corresponding to registers, programmable memory, or revision select signals for example. The table fully describes the hardware behavior of each output of an access enablement circuit for all modes and/or security-states of the SoC's operation. Each entry in the table corresponds to an output signal generated by the AEC. Each output signal will have a defined behavior based on the inputs for the entry, including for example, the security state of the chip, a software register interface, and/or one-time programmable memory bits as earlier described.

An automated script first parses the AEB table and checks for any syntax errors or omissions at block 305. If there is a syntax or omission failure, the table is rejected so that user edits and/or updates can be applied at block 315. Once the table passes the syntax and omission check, the automated script parses the AEB table to generate AEB parsing results 320. The parsing results 320 include an output signal list 322 including the outputs for access control of each security feature. The script extracts the behavior for each output signal for all modes and security states of operation. The script generates a description for one or more ROM's that define the output behaviors of the output signals. Each ROM is a two-dimensional array that defines the total set of behaviors for the AEC. As illustrated, one dimension of the ROM correlates to the number of security states of the SoC and the other dimension of the ROM correlates to the number of output signals for the AEC. Each entry in each ROM includes a binary value that encodes information relating to the output signal's behavior in a particular security state. The example of FIG. 4 includes two ROM's, ROM-A and ROM-B. When the output signals of an AEC are defined by multiple inputs with different behavioral impacts, more than one ROM can be generated, with each ROM defining an individual component of the signal's output behavior. In this particular example, a first ROM defines the default behavior of each output signal while a second ROM defines whether each output signal can be influenced by software modifiable registers. In FIG. 4, a set of ROM parity check values are also generated from the table. In parallel with generating the parsing results, the automated script calculates a hash value of the table binary at step 310. The table hash value is recorded at box 360. In one example, the hash value is recorded to provision revision control to make sure that which is fabricated from HDL is the same as the source AEB table.

After generating the AEB parsing results 320, the script automatically generates an HDL description for the AEC implementation. In one embodiment, the script instantiates each output signal and each ROM from the parsing results. The script also adds connection logic for combining inputs from the ROM(s), registers, OTP bits, etc. Optionally, the script can instantiate the ROM parity output from the parsing results to protect against silicon defects and/or silicon modification attacks (e.g., focused ion beam (FIB)). There are multiple possible HDL design topologies that may be generated. In some examples, the topology may leverage or otherwise use existing user-generated HDL. In such cases, the auto-generated HDL 345 is automatically integrated with the existing user-generated HDL at block 350. The combined HDL is then submitted for source control check-in at block 360.

Figure 5:
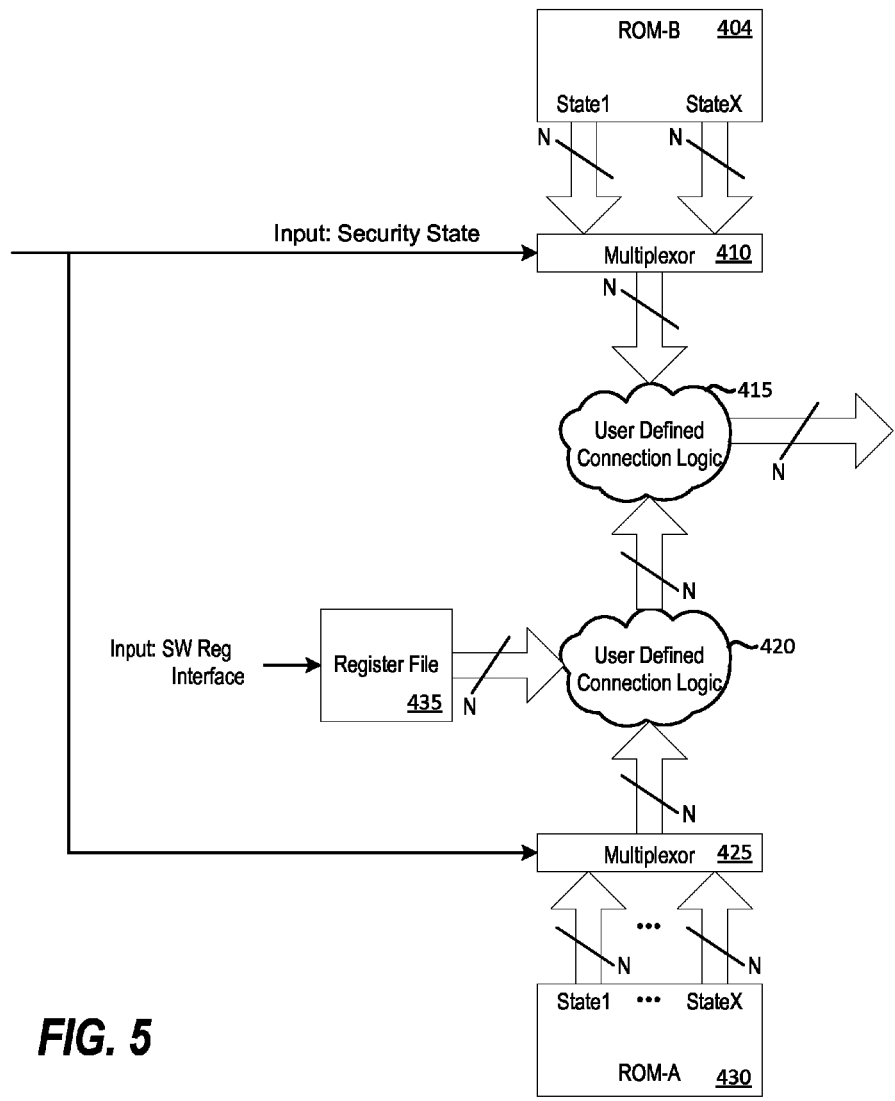
FIG. 5 is a block diagram depicting a SoC design including access enablement circuitry.

FIG. 5 is block diagram of an example of a circuit implementation in accordance with one embodiment. In this example, ROM-B 404 defines a default state of each output signal and ROM-A defines an influence of a set of software modifiable registers on each output signal. Such a ROM-based approach allows for late changes to the ROM contents via late changes to the AEB table. Because of the ROMs, the changes do not cause significant digital or physical design impact. The ROMs can be changed for subsequent silicon revisions using a single metal layer spin. In other ROM implementations, additional metal layers may be used.

For each security state, ROM-B generates an output for each security feature indicating the default state of the security feature, such as hardware-enabled, hardware-disabled, etc. In this example, ROM-B is a two-dimensional array with a first dimension equal to a number of security states (State1-StateX) and a second dimension equal to a number N of security features (N). Thus, there are N outputs for each security state. The outputs of ROM-B are communicated to a multiplexor 410 which receives as a selection input the active security state from the set of programmable fuses. The multiplexor selects a set of outputs from ROM-B based on the active security state. The multiplexor communicates with user-defined connection logic 415 to provide a set of outputs from ROM-B based on the active security state.

For each security state, ROM-A generates an output for each security feature indicating whether the security feature is modifiable by software. The outputs of ROM-A are communicated to a multiplexor 425 which receives the active security state as a selection input. The multiplexor selects and communicates to user-defined connection logic 420 a set of outputs from ROM-A based on the active security state. The connection logic 420 receives the output signals for the active security state and also a register file or other input from the set of software modifiable data registers. The register data includes an input for each security feature. Based on the input from multiplexor 425, connection logic 420 determines whether to use the register data. The connection logic chooses whether to use the register data for each security feature individually. The connection logic provides an output signal for each security feature based on the active security state. The user-defined connection logic may be unique for each output signal. For each output signal, the connection logic may provide a generic set of connection logic or custom connection logic for other output signals. Some output signals may include security sensitive custom connection logic, for example implementing voltage-attack-resistant (VAR) macros, and similar hardware to protect against security attacks.

Figure 6:
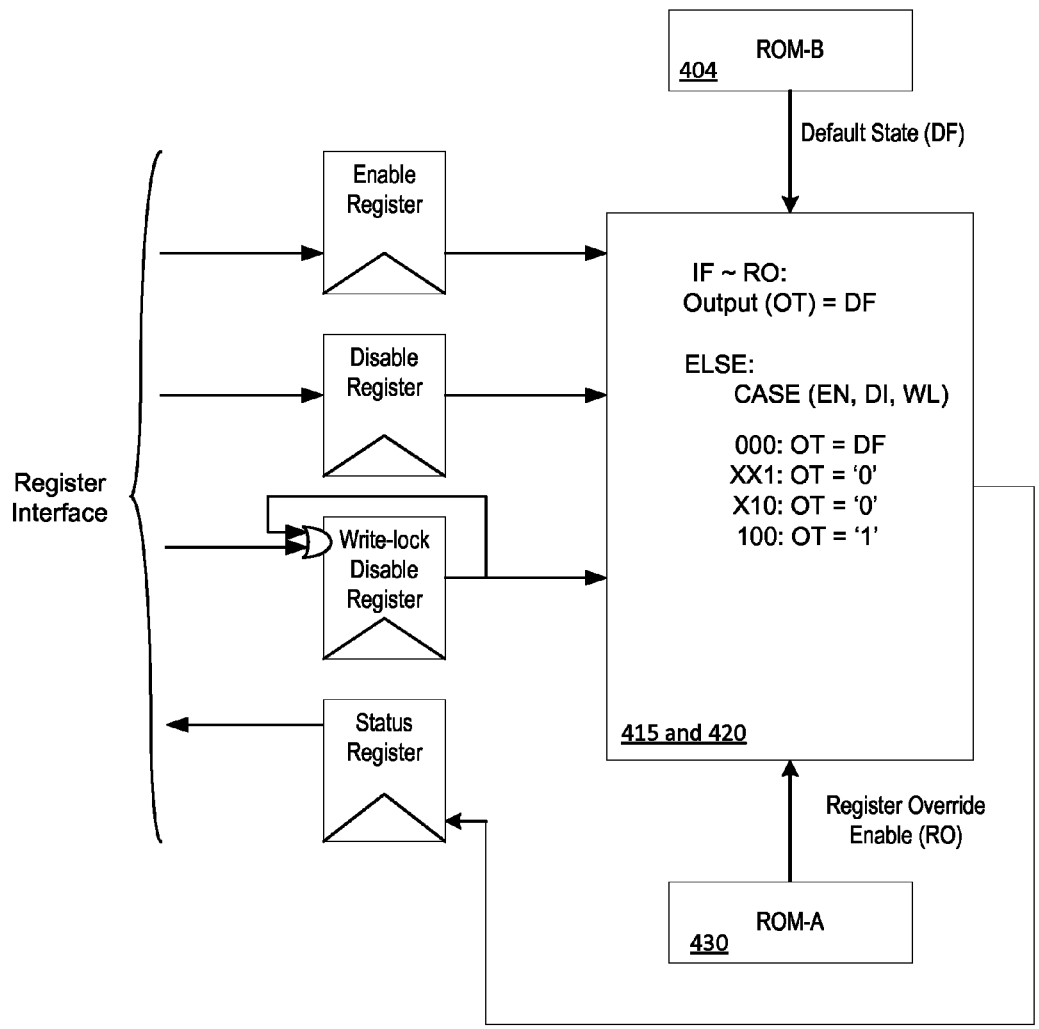
FIG. 6 is a block diagram depicting details of access enablement circuitry for an output signal.

FIG. 6 is a block diagram depicting connection logic 415 and 420 in one example. A portion of the connection logic for a single output of the access enablement circuit is depicted. The connection logic may be replicated "N" times to generate an output signal for each security feature or entry in the AEB table. In this example, register file 435 includes a set of three registers for each output signal. The registers include an "enable" (EN) register, a "disable" (DI) register, and a "write-lock disable" (WL) register. In this example, each register provides a single bit to the connection logic 420. Optionally, a read-only "status" register may be provided to feedback the state of the output signals for software checking.

ROM-B provides a default access control setting (DF) to the connection logic for the security feature. ROM-A provides a register override enable (RO) signal indicating whether the register data is to be used for the output signal. If the RO signal is asserted, the register data will override the DF setting. Otherwise, the register data will be ignored. In this example, the connection logic implements IF/ELSE logic based on the output of ROM-A. First, the connection logic determines whether the register override enable is provided from ROM-A for the security feature. If the RO signal is de-asserted, the connection logic sets the output signal (OT) to the default state DF. If the RO signal is asserted, the connection logic executes the ELSE statement including a set of case statements based on the enable register value, the disable register value, and the write-lock disable register value. In this case, if all three registers provide a binary '0,' the connection logic sets the output signal to the default state DF, either enabled or disabled. If the write-lock disable register provides a binary '1,' the connection logic sets the output signal to the '0,' indicating that the security feature is disabled. If the write-lock disable register provides a binary '0,' and the disable register provides a binary '1,' the connection logic sets the output signal to '0,' indicating that the security feature is disabled. If the write-lock disable and disable registers are both set to '0' and the enable register is set to '1,' the connection logic sets the output signal to '1' indicating that the security feature is enabled.

Although specific components and software modules are depicted, it will be apparent that numerous physical and software based configurations may be employed while remaining within the spirit of the present disclosure. Generally, software and program modules, managers and engines as described herein include routines, programs, components, data structures, and other types of structures that perform particular tasks or implement particular abstract data types. Hardware or combinations of hardware and software can be substituted for software modules as described herein.

One or more embodiments of the present disclosure may include a variety of computer readable media. Computer readable media can be any available media that can be accessed by a computing device and includes both volatile and nonvolatile media, removable and non-removable media. By way of example, and not limitation, computer readable media may comprise computer readable storage media and communication media. Computer readable storage media includes volatile and nonvolatile, as well as removable and non-removable media implemented in any method or technology for storage of information such as computer readable instructions, data structures, program modules or other data. Computer readable storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the information and which can be accessed by a computing device. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

Accordingly, there has been described a system-on-chip that comprises a plurality of hardware modules implemented on a silicon substrate and that are configured for communication over one or more buses. The plurality of hardware modules provide a plurality of security features. The SoC includes a set of programmable fuses defining a progression of a plurality of security states for the system-on-chip and at least one read only memory (ROM) defining an access control setting for each security feature in each security state. A centralized access enablement (AEB) circuit of the SoC is provided for controlling access to the plurality of security feature. The centralized AEB circuit includes a plurality of outputs. Each output corresponds to a security feature of the hardware modules and controls access to the security feature. The AEB circuit generates each output based on an output of the at least one ROM for an active security state.

There has further been described a computer-implemented method of system-on-chip design that comprises generating an access enablement table for a plurality of security features of a system-on-chip (SoC). The access enablement table includes for each security feature a plurality of access control settings corresponding to a plurality of security states of the SoC. The method includes automatically parsing the access enablement table to generate one or more components for describing an access enablement circuit to control the plurality of security feature of the SoC, and automatically generating a hardware description of the access enablement circuit from the one or more components.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A system-on-chip, comprising:
a plurality of hardware modules implemented on a silicon substrate, the plurality of hardware modules configured for communication over one or more buses;
a plurality of security features provided by the plurality of hardware modules;
a one-time programmable memory storing information to indicate a progression of a plurality of security states for the system-on-chip;
a first memory including a default access control setting for each security feature in each security state;
a set of registers configured to store register data corresponding to the plurality of security features;
a second memory configured to provide an override signal indicating whether the register data is to override the default access control setting for each security feature; and
a centralized access enablement (AEB) circuit configured to control access to the plurality of security features, the centralized AEB circuit including a plurality of outputs, each output corresponding to a security feature of the hardware modules and configured to control access to the security feature, the centralized AEB circuit is configured to provide the output corresponding to a security feature based on an output of the set of registers for an active security state in response to the override signal being asserted.

2. A system-on-chip according to claim 1, wherein:
the first memory includes a first read only memory (ROM) including the default access control setting for each security feature in each security state; and the second memory includes a second read only memory (ROM) configured to provide the override signal indicating whether the register data is to override the default access control setting for each security feature.

3. A system-on-chip according to claim 2, wherein:
the set of registers include for each output a disable register, an enable register, and a write lock enable register.

4. A system-on-chip according to claim 3, wherein:
the AEB circuit configured to access the set of data registers for the corresponding output to determine an access control setting for the security feature based at least in part on the second ROM indicating that access to a security feature may be modified by register data; and
the AEB circuit configured to determine the default access control setting for the security feature from the first ROM and generate an output signal based on the default access control setting based at least in part on the second ROM indicating that access to a security feature may be modified by register data.

5. A system-on-chip according to claim 4, wherein:
the first ROM includes a disabled default access control setting for a first security feature in a first security state;
the second ROM configured to indicate whether the output corresponding to the first security feature may be modified by the register data;
the AEB circuit configured to enable the first security feature in response to a predetermined value from the enable register for the first security feature; and
the AEB circuit configured to disable the first security feature based at least in part on a predetermined value from the write lock enable register.

6. A system-on-chip according to claim 5, wherein:
the write lock enable register is lockable to the predetermined value for a current boot cycle after being written to the predetermined value.

7. A system-on-chip according to claim 4, wherein:
the first ROM includes a disabled default access control setting for a first security feature in a first security state;
the second ROM configured to indicate whether the output corresponding to the first security feature may be modified by the register data;
the AEB circuit configured to enable the first security feature based at least in part on a predetermined value from the enable register for the first security feature; and
the AEB circuit configured to lock the first security feature as enabled based at least in part on a predetermined value from the write lock enable register.

8. A system-on-chip according to claim 1, wherein the one-time programmable memory is a first one-time programmable memory, the system-on-chip further comprising:
a second one-time programmable memory;
wherein the second memory includes a read only memory (ROM) configured to define an ability of the second one-time programmable memory to affect access to each security feature.

9. A system-on-chip according to claim 1, wherein:
the plurality of security features include one or more of debug logic, clock controls and test buses.

10. A system-on-chip, comprising:
a plurality of hardware modules implemented on a silicon substrate, the plurality of hardware modules configured for communication over one or more buses;
a plurality of security features provided by the plurality of hardware modules;

a one-time programmable memory configured to define a progression of a plurality of security states for the system-on-chip;
a first memory configured to define a default access control setting for each security feature in each security state; and
a second memory configured to define an ability of register data to affect access to each security feature;
a centralized access enablement (AEB) circuit configured to control access to the plurality of security features, the centralized AEB circuit including a plurality of outputs, each output corresponding to a security feature of the hardware modules and configured to control access to the security feature, the AEB circuit configured to provide each output based on an output of the first memory for an active security state; and
a set of registers configured to store the register data, the set of registers including for each output a disable register, an enable register, and a write lock enable register;
the AEB circuit configured to access the set of data registers for a corresponding output to determine an access control setting for a security feature based at least in part on the second memory indicating that access to the security feature may be modified by register data;
the AEB circuit configured to determine the default access control setting for a security feature from the first memory and generate an output signal using the default access control setting based at least in part on the second memory indicating that access to the security feature may not be modified by register data.

11. The system-on-chip of claim 10, wherein:
the first memory includes a first read only memory (ROM) configured to define the default access control setting for each security feature in each security state; and
the second memory includes a second read only memory (ROM) configured to define the ability of register data to affect access to each security feature.

12. The system-on-chip of claim 11, wherein:
the first ROM configured to define a disabled default access control setting for a first security feature in a first security state;
the second ROM configured to indicate whether the output corresponding to the first security feature may be modified by the register data;
the AEB circuit configured to enable the first security feature based at least in part on a predetermined value from the enable register for the first security feature; and
the AEB circuit configured to disable the first security feature based at least in part on a predetermined value from the write lock enable register.

13. The system-on-chip of claim 12, wherein:
the write lock enable register is lockable to the predetermined value for a current boot cycle based at least in part on being written to the predetermined value.

14. The system-on-chip of claim 11, wherein:
the first ROM configured to define a disabled default access control setting for a first security feature in a first security state;
the second ROM configured to indicate whether the output corresponding to the first security feature may be modified by the register data;
the AEB circuit configured to enable the first security feature in response to a predetermined value from the enable register for the first security feature; and
the AEB circuit configured to lock the first security feature as enabled based at least in part on a predetermined value from the write lock enable register.

15. The system-on-chip of claim 10, wherein the one-time programmable memory is a first one-time programmable memory, the system-on-chip further comprising:
a second one-time programmable memory;
wherein the second memory includes a read only memory (ROM) configured to define an ability of the second one-time programmable memory to affect access to each security feature.

16. The system-on-chip of claim 10, wherein:
the plurality of security features include one or more of debug logic, clock controls and test buses.

17. A system-on-chip, comprising:
a plurality of hardware modules implemented on a silicon substrate, the plurality of hardware modules configured for communication over one or more buses;
a plurality of security features provided by the plurality of hardware modules;
a one-time programmable memory storing information to indicate a progression of a plurality of security states for the system-on-chip;
a first read only memory (ROM) including a default access control setting for each security feature in each security state;
a set of registers configured to store register data corresponding to the plurality of security features, the set of registers include for each output a disable register, an enable register, and a write lock enable register;
a second read only memory (ROM) storing information to indicate an ability of the register data to affect access to each security feature; and
a centralized access enablement (AEB) circuit configured to control access to the plurality of security features, the centralized AEB circuit including a plurality of outputs, each output corresponding to a security feature of the hardware modules and controlling access to the security feature, the centralized AEB circuit is configured to provide each output based on an output of the first ROM for an active security state;
wherein based at least in part on the second ROM storing information to indicate that access to a security feature may be modified by register data, the AEB circuit is configured to access the set of data registers for the corresponding output to determine an access control setting for the security feature; and
wherein based at least in part on the second ROM storing information to indicate that access to a security feature may not be modified by register data, the AEB circuit is configured to determine the default access control setting for the security feature from the first ROM and generate an output signal based on the default access control setting.

18. A system-on-chip according to claim 17, wherein:
the first ROM configured to define a disabled default access control setting for a first security feature in a first security state;
the second ROM configured to indicate that the output corresponding to the first security feature may be modified by the register data;

the AEB circuit configured to enable the first security feature based at least in part on a predetermined value from the enable register for the first security feature; and the AEB circuit configured to disable the first security feature based at least in part on a predetermined value from the write lock enable register.

19. A system-on-chip according to claim 18, wherein:
the write lock enable register is lockable to the predetermined value for a current boot cycle based at least in part on being written to the predetermined value.

20. A system-on-chip according to claim 17, wherein:
the first ROM includes a disabled default access control setting for a first security feature in a first security state;
the second ROM configured to indicate that the output corresponding to the first security feature may be modified by the register data;
the AEB circuit configured to enable the first security feature based at least in part on a predetermined value from the enable register for the first security feature; and
the AEB circuit configured to lock the first security feature as enabled based at least in part on a predetermined value from the write lock enable register.

21. A method, comprising:
providing by a plurality of hardware modules of a system-on-chip a plurality of security features, the plurality of hardware modules configured for communication over one or more buses;
providing by a one-time programming memory an indication of a progression of a plurality of security states for the system-on-chip;
storing in a first memory a default access control setting for each security feature in each security state;
storing in a set of registers register data corresponding to the plurality of security features;
providing from a second memory an override signal for each security feature indicating whether the register data is to override the default access control setting; and
providing by a centralized access enablement (AEB) circuit a plurality of outputs for controlling access to the plurality of security features, wherein the AEB circuit provides the output corresponding to a security feature based on an output of the set of registers for an active security state based at least in part on the override signal being asserted for the corresponding security feature.

22. The method of claim 21, wherein:
storing in the first memory comprises storing in a first read only memory (ROM) the default access control setting for each security feature in each security state; and
providing from the second memory comprises providing from a second read only memory (ROM) the override signal for each security feature indicating whether the register data is to override the default access control signal.

23. The method of claim 22, wherein:
the set of registers include for each output a disable register, an enable register, and a write lock enable register.

24. The method of claim 23, further comprising:
accessing by the AEB circuit the set of data registers for a security feature to determine an access control setting for the security feature based at least in part on the second ROM indicating that access to the security feature may be modified by the register data; and
determining by the AEB circuit the default access control setting for a security feature from the first ROM and generating an output signal based on the default access control setting based at least in part on the second ROM indicating that access to the security feature may not be modified by the register data.

25. A method, comprising:
providing by a plurality of hardware modules of a system-on-chip a plurality of security features, the plurality of hardware modules are configured for communication over one or more buses;
providing by a one-time programmable memory an indication of a progression of a plurality of security states for the system-on-chip;
providing by a centralized access enablement (AEB) circuit a plurality of outputs corresponding to the plurality of security features;
storing in a first memory a default access control setting for each security feature in each security state;
storing register data in a set of registers, the set of registers including for each output of the AEB circuit a disable register, an enable register, and a write lock enable register;
storing in a second memory an indication of an ability of the register data to affect access to each security feature;
accessing the set of data registers for a corresponding output of the AEB to determine an access control setting for a corresponding security feature based at least in part on the second memory indicating that access to the corresponding security feature may be affected by register data; and
determining the default access control setting for a corresponding security feature from the first memory and generating an output signal based on the default access control setting based at least in part on the second memory indicating that access to the corresponding security feature may not be affected by register data.

26. The method of claim 25, wherein:
storing in the first memory comprises storing in a first read only memory (ROM) the default access control setting for each security feature in each security state; and
storing in the second memory comprises storing in a second read only memory (ROM) the indication of the ability of the register data to affect access to each security feature.

27. The method of claim 26, wherein:
the set of registers include for each output a disable register, an enable register, and a write lock enable register.

* * * * *